Oct. 21, 1969    R. A. SANDERSON    3,473,963
FUEL CELL SYSTEM WITH AUTOMATIC CONTROL MEANS
Filed Feb. 23, 1967    2 Sheets-Sheet 1

INVENTOR
ROBERT A. SANDERSON
BY Charles A. Warren
ATTORNEY

United States Patent Office 3,473,963
Patented Oct. 21, 1969

3,473,963
FUEL CELL SYSTEM WITH AUTOMATIC CONTROL MEANS
Robert A. Sanderson, Thompsonville, Conn., assignor to United Aircraft Corporation, East Hartford, Conn., a corporation of Delaware
Filed Feb. 23, 1967, Ser. No. 617,982
Int. Cl. H01m 27/12
U.S. Cl. 136—86      3 Claims

ABSTRACT OF THE DISCLOSURE

A fuel cell system operating on hydrogen and air is enclosed in a casing through which cooling air is circulated by a fan and the reactant air is pumped into the cell from within the casing. The pump is a variable speed pump to proportion the reactant air to the cell requirements and the excess air carries from the cell the water formed within the cell. By recirculating a part of the reactant air adequate moisture is supplied to the air entering the cell and a scrubber removes any carbon dioxide from the reactant air prior to entering the cell.

The invention herein described was reduced to practise in the course of a contract with the Department of the Army.

Background of the invention

This invention relates to fuel cell systems and particularly to a system for supplying air to the cell and for maintaining the cell at the desirable operating temperature.

One problem is the maintenance of the water balance within the cell in order to prevent flooding or drying out of the electrodes thereby reducing the power output of the individual cells in the stack.

Another of the problems in these fuel cell systems is a control of the operating temperature of the cell within the desired limits regardless of the power utilized and at the same time prevent condensation from occurring in the reactant air system and the scrubber that removes the carbon dioxide from the air going to the cell.

Summary of invention

One feature of the invention is a control of the air flow over the fuel cell module in order to maintain the temperature of the cell at the proper value. Another feature is the control of the cooling air into and out of the casing for the fuel cell system in conjunction with the flow of air over the module to adjust for ambient temperatures. Another feature is the adjustment of the cooling air fan speed as a function of power output thereby maintaining the flow of cooling air in proportion to power output. Another feature is the withdrawal of reactant air from the cooling air at a point where the temperature is substantially constant in order to minimize the effect of reactant air temperature on cell operation and avoid condensation in the reactant inlet air lines and $CO_2$ scrubber.

Description of the preferred embodiment

Figure 1:
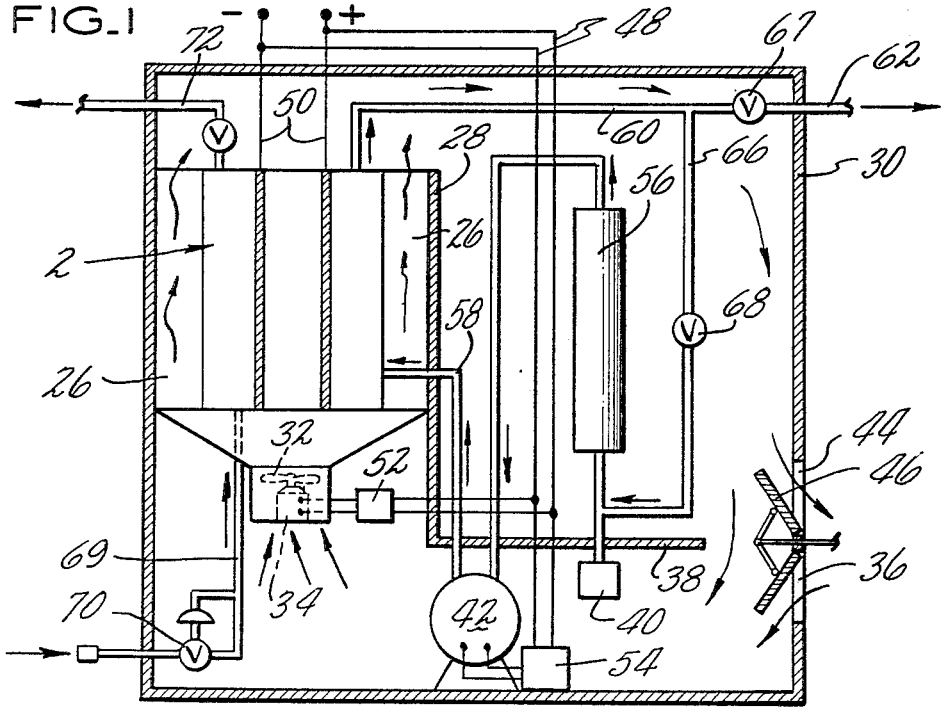
FIG. 1 is a diagram of a fuel cell system incorporating the invention.
Figure 4:
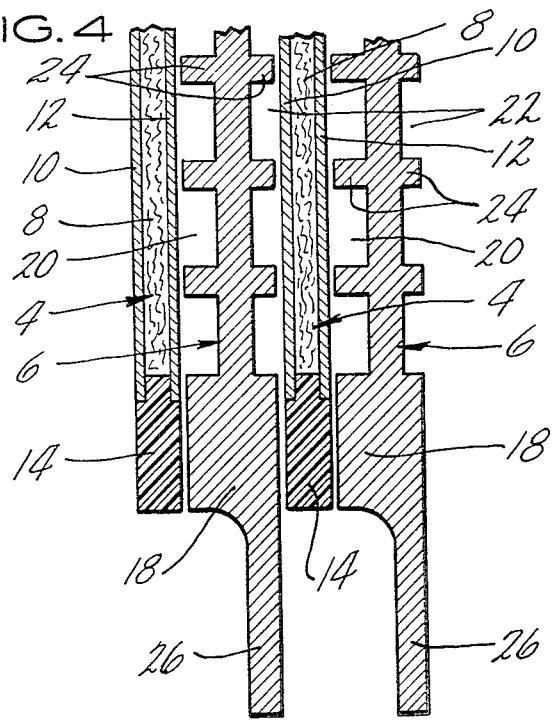
FIG. 4 is a fragmentary sectional view of two of the fuel cells making up the module.

The fuel cell module 2, FIG. 1, is made up of a plurality of fuel cells 4, FIG. 4, arranged in stacked relation with cooling plates 6 therebetween to produce the desired power requirement for the module. The arrangement of such a module is shown and claimed in Gelting, Serial No. 586,252, filed October 12, 1966, and having the same assignee as this application. For the purpose of this application, the fuel cell 4 is made up of an electrolyte matrix 8 with electrodes 10 and 12 on opposite sides thereof and in contact therewith. The periphery of the assemblage of matrix and electrodes has a sealing border frame 14. Between adjacent cells is the cooling plate 6 having a peripheral full thickness border 18 engaging, when assembled, with the frames 14. Inwardly of the border, the cooling plate is reduced in thickness to form a fuel chamber 20 on one side and an oxidant chamber 22 on the other side. Each chamber has a plurality of closely spaced projections 24 to engage with the electrodes and thereby transmit the generated electricity in the electrode to the plate 6. The showing of FIG. 4 has the parts spaced for clarity. In use the several parts shown are tightly clamped together within the remainder of the stack of cells in forming the module. The cooling plates 6 have cooling fins 26 projecting beyond the stack at opposite sides over which the cooling air for the module is circulated.

When a fuel cell assembly is put together in this manner it may be operated at a pressure of from 0 to 3 p.s.i. gauge, the pressure being preferably between one and two pounds. The operating temperature of the cell is preferably between 150° and 180° since at this temperature it has been found that there is no material problem in balancing the water production within and the water content of the cell. With this type of cell the electrolyte is preferably a base, for example, an aqueous solution of potassium hydroxide and the electrodes may be a nickel oxide sinter which is catalyzed or a catalyzing screen electrode as, for example, the electrode described in the copending application of Richmond, 491,871, filed September 30, 1965. The fuel is preferably hydrogen and the oxidant is oxygen obtained from the reactant air.

Referring to FIG. 1, the module is positioned in a duct 28 within a casing 30 and a cooling air fan 32 driven by a variable speed motor 34 blows air over the fins 26, as shown by the arrows. The cooling air enters the casing 30 through an inlet opening 36 and is guided by a wall 38 communicating with the duct 28 to pass over the reactant air intake 40 and over a reactant air pump 42 to the cooling fan. From the module 2 the cooling air passes to the air outlet opening 44 in part, and the remainder of the air is recirculated past the dampers 46 and around the end of the wall 38 to pass the reactant air inlet again.

The dampers 46 are movable as a unit to open or close the inlet and outlet openings 36 and 44 equal amounts to vary the proportion of cooling air that is recirculated. In FIG. 1 these dampers are manually adjusted dependent upon the surrounding temperature.

The speed of the cooling air fan is adjusted as a function of the cell output and is preferably directly proportional to the output. To accomplish this, electrical leads 48 connect the power output lines 50 to a speed control 52 for the motor 34. The speed of the reactant air pump 42 is also adjusted as a function of load current. To this end, the leads 48 also connect to a control box 54 by which the speed of this pump is adjusted.

Reactant air from the inlet 40 goes to a $CO_2$ scrubber 56 and thence to the air pump. On the downstream side of the pump the air goes through conduit 58 to the air chambers of the cell module. Excess reactant air discharges from the module through a discharge conduit 60 to the exhaust 62 outside the wall of the casing.

The $CO_2$ scrubber may be any well-known type as, for example, a structure that includes a soda-lime bed through which the air is passed as it flows through the scrubber. An example of this type of device is shown in the copending application of Sanderson, Serial No. 616,369 filed February 15, 1967.

A part of the reactant air from the cell, laden with moisture from the cell, is directed through a bypass conduit 66 to the reactant air conduit at the inlet side of the scrubber 56 to maintain the desired moisture for the reactant air entering the cell. Humidifying the air has two beneficial effects; it provides more uniform electrolyte conditions within the cell which enhances cell performance and it improves the $CO_2$ absorption capacity of the soda-lime scrubber. Mixing a portion of fuel cell exhaust air with the inlet air permits the omission of a humidifier for this air. Suitable control valves 67 and 68 in the exhaust conduit and in the bypass control the quantity of recycled reactant air. These valves may be manually adjusted for many installations.

Hydrogen gas is used as the fuel and this is supplied from any suitable source through an inlet pipe 69 in which a pressure regulating valve 70 is incorporated. Any excess hydrogen vents through a vent pipe 72. When the system is set in operation by applying a load to the power leads 50 there is adequate air present within the cell to supply oxidant for beginning the generation of electrical power. With a load applied to the cell module the air pump control 54 will set the pump in operation and adjust its speed to the load so that reactant air will be supplied in the proper quantity for the cell. The cooling fan will also be put in operation and cooling air will be circulated around the coolant path and past the dampers 46. These dampers have been manually adjusted to the ambient temperature outside of the casing.

An example of operating temperature and pressures in a system of this type is as follows when the powerplant is operating.

System flows at max. power:
　Power level, 650 watts gross
　Ambient Temp., 120° F.
　Relative Humidity, 0%.

| Station | Temp., °F. | Press., p.s.i.a. | Flows, lbs./hr. | | |
|---|---|---|---|---|---|
| | | | $H_2O$ | $H_2$ | Air |
| $H_2$ Inlet | 120 | 28.0 | | 0.068 | |
| $H_2$ Outlet at module | 165 | 15.7 | | (¹) | |
| Reactant air intake | 120 | 14.7 | | | 3.88 |
| Scrubber inlet | 134 | 14.7 | 0.261 | | 5.45 |
| Reactant at module inlet | 140 | 15.1 | 0.261 | | 5.45 |
| Reactant air at module outlet | 165 | 14.8 | 0.868 | | 4.91 |
| Reactant air at valve 67 | 165 | 14.7 | 0.261 | | 1.57 |
| Cooling air inlet | 120 | 14.7 | | | 329.88 |
| Cooling air at fan | 123.7 | 14.7 | | | 326 |
| Cooling air at outlet | 139.6 | 14.7 | | | 326 |

¹ Intermittent.

Figure 2:
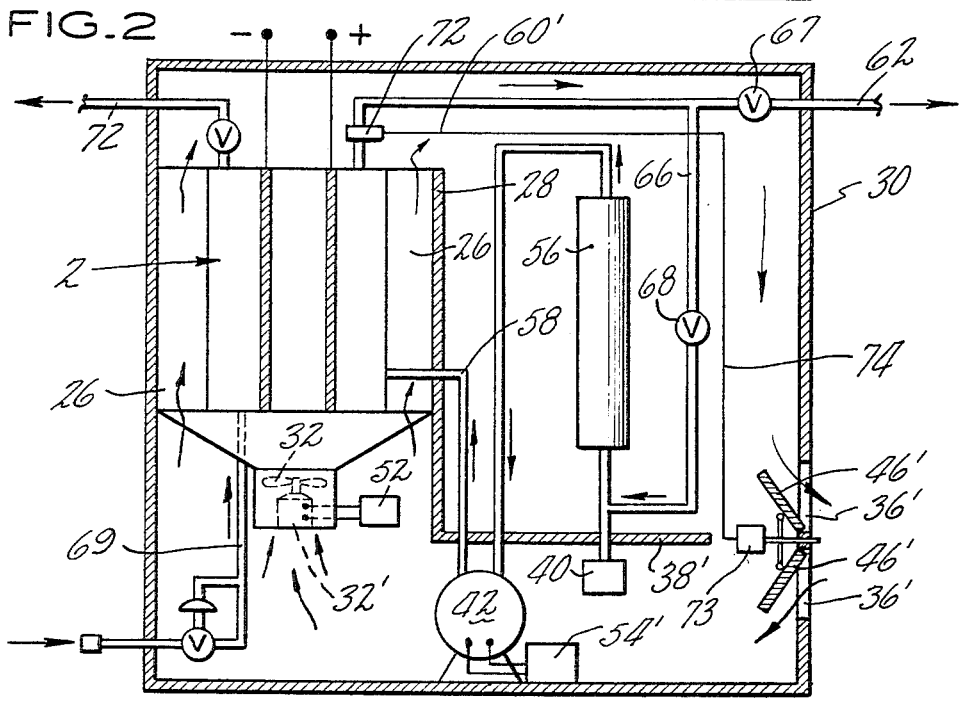
FIG. 2 is a diagram similar to FIG. 1 of a modification.

Referring now to FIG. 2, the dampers 46' corresponding to the dampers 46 of FIG. 1 are adjusted as a function of the temperature of the reactant air leaving the cell. To this end a temperature sensing device 72 is positioned in the air outlet conduit 60' and is connected to an actuator 72 by a suitable connector 74. The arrangement is such that as the temperature of the reactant air increases the dampers are moved to increase the flow of cooling air through the inlet 36' and at the same time decreases the amount of recirculated cooling air past the end of the wall 38'. With this arrangement the cooling fan 32' may operate at a constant speed thereby eliminating the necessity of a control for this fan motor. It will be understood, however, that a speed control 54' is provided for the reactant air pump 42' in the same manner as provided in FIG. 1.

Figure 3:
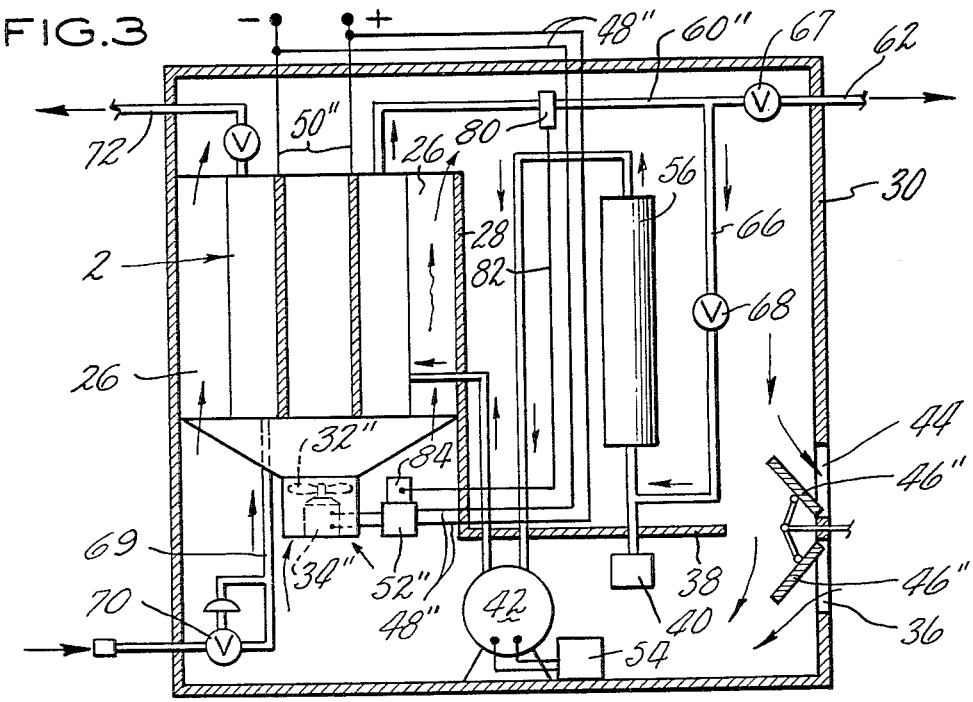
FIG. 3 is a diagram similar to FIG. 1 showing a further modification.

Referring now to FIG. 3, the louvers 46'' in this installation will again be manually operated as in FIG. 1 but the speed of the cooling air fan 32'' will be adjusted as a function of the load on the fuel cell module as by suitable control leads 48'' from the power leads 50'' to a control box 52'' for the motor 34''.

Superimposed on this control is a temperature control override which senses the temperature of the exhaust reactant air from the cell. Thus there is provided a temperature sensing device 80 in the outlet conduit 60'' and this temperature sensor is connected by a lead 82 to a control box 84 associated with the control box 52''. Thus, if the temperature of the reactant air discharging from the cell is greater than the design temperature at the load applied, the control 84 will become operative to increase the fan speed beyond that established by the control 52''. Similarly, if the temperature of the reactant air exhaust drops below the design temperature for the applied load, the control 84 will override the control 52'' and further reduce the speed of the cooling fan. The effect of the temperature override is to keep the cell temperature within established limits at any cell loading.

The arrangements above described provide a self-contained fuel cell system that will operate between no load and full load entirely automatically. When the load is reduced to zero the pressure in the hydrogen compartments will build up so that the inflow of hydrogen will stop and at the same time the reactant air pump will stop because there is no load applied to the cell. At normal full load of the system the air pump will be operating to supply the maximum amount of reactant air through the air compartments and the speed of the cooling fan in FIGS. 1 and 3 will be close to the maximum speed for maintaining nearly the maximum cooling effect. It will be noted that the location of the reactant air inlet is within the casing and in a location such that recirculated air flows past this intake so that air entering the reactant air system is at substantially the same temperature throughout the system operation.

I claim:

1. A fuel cell system including a casing having air inlet and outlet openings therein, a valve element controlling at least one of said openings, a fuel cell module positioned within the enclosure and utilizing air as the oxidant, said module having cooling fins thereon, an air pump within the casing having an inlet port, a reactant air inlet located within the casing and connected to the pump inlet port, said pump also having an outlet port connected to the fuel cell for delivering reactant air under pressure to the fuel cell, a variable speed motor driving said pump and means for controlling the speed as a function of the current output of the module, a cooling air fan for circulating air through the casing from the inlet to the outlet and past the air pump inlet, an outlet for the reactant air from the cell and a conduit from this outlet to a point external of the casing, and means for recycling a part of this outlet air to the pump inlet for supplying humidity to the reactant air delivered to the cell.

2. A fuel cell system as in claim 1 having a $CO_2$ scrubber between the reactant air inlet and the pump and having the recycled humidified air entry upstream of the scrubber.

3. In a fuel cell system including a casing containing a fuel cell module utilizing hydrogen and reactant air in the production of electricity, the casing having an air inlet opening and an air outlet opening and a valve controlling at least one of the openings depending upon the surrounding air temperature, a reactant air inlet within the casing, a pump for supplying air under pressure to said module from said reactant air inlet in excess of the quantity utilized in the cell, the excess of air removing water vapor formed during cell operation, means for controlling the speed of the pump as a function of the current output of the cell, a $CO_2$ scrubbed located between the reactant air inlet and the module, means for recycling a part of the excess air to the reactant air supply upstream of the $CO_2$ scrubber thereby adding water vapor to the air delivered to the scrubber and to the cell, valve means for controlling the portion of excess reactant air that is recycled, a variable speed fan for the recirculating cooling air within the casing past the air inlet and outlet openings in the casing and means for adjusting the speed of the fan as a function of the current output of the cell so that air entering the reactant air inlet is at substantially the same temperature throughout system operation.

References Cited
UNITED STATES PATENTS

| | | | |
|---|---|---|---|
| 3,012,086 | 12/1961 | Vahldieck | 136—86 |
| 3,061,658 | 10/1962 | Blackmer | 136—86 |
| 3,099,587 | 7/1963 | Chambers et al. | 136—86 |
| 3,112,229 | 11/1963 | Baron et al. | 36—86 |
| 3,150,657 | 9/1964 | Shultz et al. | 136—86 X |
| 3,160,528 | 12/1964 | Dengler et al. | 136—86 |
| 2,925,455 | 2/1960 | Eidensohn et al. | 136—86 |

ALLEN B. CURTIS, Primary Examiner